3,009,940
DIALKYLCARBAMYL PHOSPHORODITHIOATES AS COMPOSITIONS OF MATTER AND AS PESTICIDES
Harry Tilles, El Cerrito, Calif., assignor to Stauffer Chemical Company, a corporation of Delaware
No Drawing. Filed Dec. 10, 1959, Ser. No. 858,582
6 Claims. (Cl. 260—461)

This invention relates to certain novel compositions of matter and to the use of such compositions as pesticides. The compositions of the present invention have the following general formula:

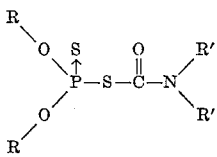

wherein R and R' are lower alkyl radicals.

The compositions of the present invention may be made in accordance with the following non-limiting examples: (Each compound has been assigned a code number which is used throughout the balance of the specification.)

Example 1—(R–1366). About 189 g. (0.75 mole) of technical potassium O,O-diisopropylphosphorodithioate was dissolved in 800 ml. of dry acetone and 75.3 g. (0.70 mole) of dimethylcarbamyl chloride was added rapidly to the solution at room temperature. The mixture was then refluxed for 15 hours. The salt cake resulting was then filtered and washed with 2-25 cc. portions of acetone. The acetone solvent was evaporated on a steam bath, the residual mixture of solid and liquid was added to 200 ml. of benzene and was washed with 4–100 ml. portions of water. The benzene solution was then dried over anhydrous magnesium sulfate, filtered, and the filtrate was evaporated on a steam bath by blowing air over it. There was obtained 137 g. (68.5% yield) of S-dimethylcarbamyl O,O-diisopropylphosphorodithioate, $$N_D^{25} = 1.5100$$

R–1366 has been obtained in a yield of 76.3% when methyl ethyl ketone was added as solvent and in a yield of 77.6% when benzene containing 10% by volume of methyl ethyl ketone was used as solvent.

Example 2—(R–1417). When the general procedure of Example 1 was repeated except that 189 g. (0.75 mole) of potassium O,O-diisopropylphosphorodithioate, 95 g. (0.70 mole) of diethylcarbamyl chloride and 1000 cc. of dry acetone are employed, there is obtained 151.5 g. (69.2% yield) of S-diethylcarbamyl O,O-diisopropylphosphorodithioate, $N_D^{26} = 1.5059$.

Analysis.—Calcd. for phosphorous: 9.90%. Found: 9.91%.

Example 3—(R–1422A). When the general procedure of Example 1 is repeated except that 121.8 g. (0.60 mole) of technical ammonium O,O-diethylphosphorodithioate, 53.8 g. (0.50 mole) of dimethylcarbamyl chloride and 650 cc. of dry acetone are employed, there is obtained 74 g. (57.5% yield) of S-dimethylcarbamyl O,O-diethylphosphorodithioate, $N_D^{27} = 1.5235$.

Analysis.—Calcd. for phosphorous: 12.1%. Found: 12.2%.

Example 4—(R–1496). When the general procedure of Example 1 is repeated except that 40.6 g. (0.20 mole) of technical ammonium O,O-diethylphosphorodithioate, 27.1 g. (0.20 mole) of diethylcarbamyl chloride and 250 cc. of dry acetone are employed, there is obtained 39 g. (68.4% yield) of S-diethylcarbamyl O,O-diethylphosphorodithioate, $N_D^{28} = 1.5140$.

Example 5—(R–1511). When the general procedure of Example 1 is repeated except that 44.1 g. (0.25 mole) of potassium O,O-dimethylphosphorodithioate, 21.5 g. (0.20 mole) of dimethylcarbamyl chloride and 300 ml. of dry acetone are employed, there is obtained 14 g. (30.6% yield) of S-dimethylcarbamyl O,O-dimethylphosphorodithioate, $N_D^{25.5} = 1.5230$.

Example 6—(R–1512). When the general procedure of Example 1 is repeated except that 44.1 g. (0.25 mole) of potassium O,O-dimethylphosphorodithioate, 27.1 g. (0.20 mole) of diethylcarbamyl chloride and 300 cc. of dry acetone are employed, there is obtained 21.0 g. (40.7% yield) of S-diethylcarbamyl O,O-dimethylphosphorodithioate, $N_D^{22} = 1.5213$.

The compounds prepared above were tested against houseflies (musca domestica) by depositing measured amounts of the compound under test in 60 x 15 mm. petri dishes and placing the dishes in closed and open cages. Adult female flies were then placed in the cages for 48 hours and at the end of that time mortality counts were made. Results are expressed in percentage of flies killed. Open cage tests are reported as "Contact" and closed cage tests are reported as "Contact Fumigation." In each case, the quantity of the compound is expressed in micrograms. The following data were obtained:

| | Housefly Residual Test—Percent Mortality | | | | | |
|---|---|---|---|---|---|---|
| | Contact | | | Contact Fumigation | | |
| | 1,000 | 100 | 50 | 1,000 | 100 | 50 |
| R–1366 | 100 | 32 | 0 | 100 | 64 | 4 |
| R–1417 | 100 | 96 | 96 | 100 | 100 | 100 |
| | 500 | 250 | 100 | 50 | 500 | 250 | 100 | 50 |
| R–1422A | | 76 | 40 | 4 | | 96 | 40 | 4 |
| R–1496 | 100 | | 92 | 16 | 100 | | 100 | 8 |
| R–1511 | 100 | 96 | 60 | | 100 | 96 | 56 | |
| R–1512 | 100 | 92 | 16 | | 100 | 54 | 5 | |

The compounds of the present invention may be employed as pesticides by dispersing them in the form of solutions or emulsions or they may be employed as dusts with suitable finely divided carriers.

This is a continuation-in-part of application Serial No. 611,711 filed September 24, 1956.

I claim:
1. As a new composition of matter a compound of the formula

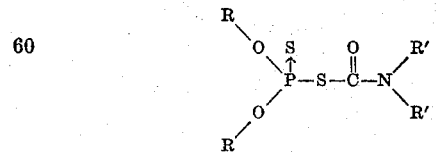

wherein each of R' and R is a lower alkyl radical.

2. As a new composition of matter S-dimethylcarbamyl O,O-diisopropylphosphorodithioate.

3. As a new composition of matter S-diethylcarbamyl O,O-diisopropylphosphorodithioate.

4. As a new composition of matter S-dimethylcarbamyl O,O-diethylphosphorodithioate.

5. As a new composition of matter S-diethylcarbamyl O,O-diethylphosphorodithioate.

6. As a new composition of matter S-dimethylcarbamyl O,O-dimethylphosphorodithioate.

References Cited in the file of this patent

UNITED STATES PATENTS

| | | |
|---|---|---|
| 2,354,536 | Nelson | July 25, 1944 |
| 2,648,696 | Whetstone | Aug. 11, 1953 |
| 2,743,235 | McDermott | Apr. 24, 1956 |

FOREIGN PATENTS

| | | |
|---|---|---|
| 835,302 | Germany | Mar. 31, 1952 |